Patented Feb. 28, 1928.

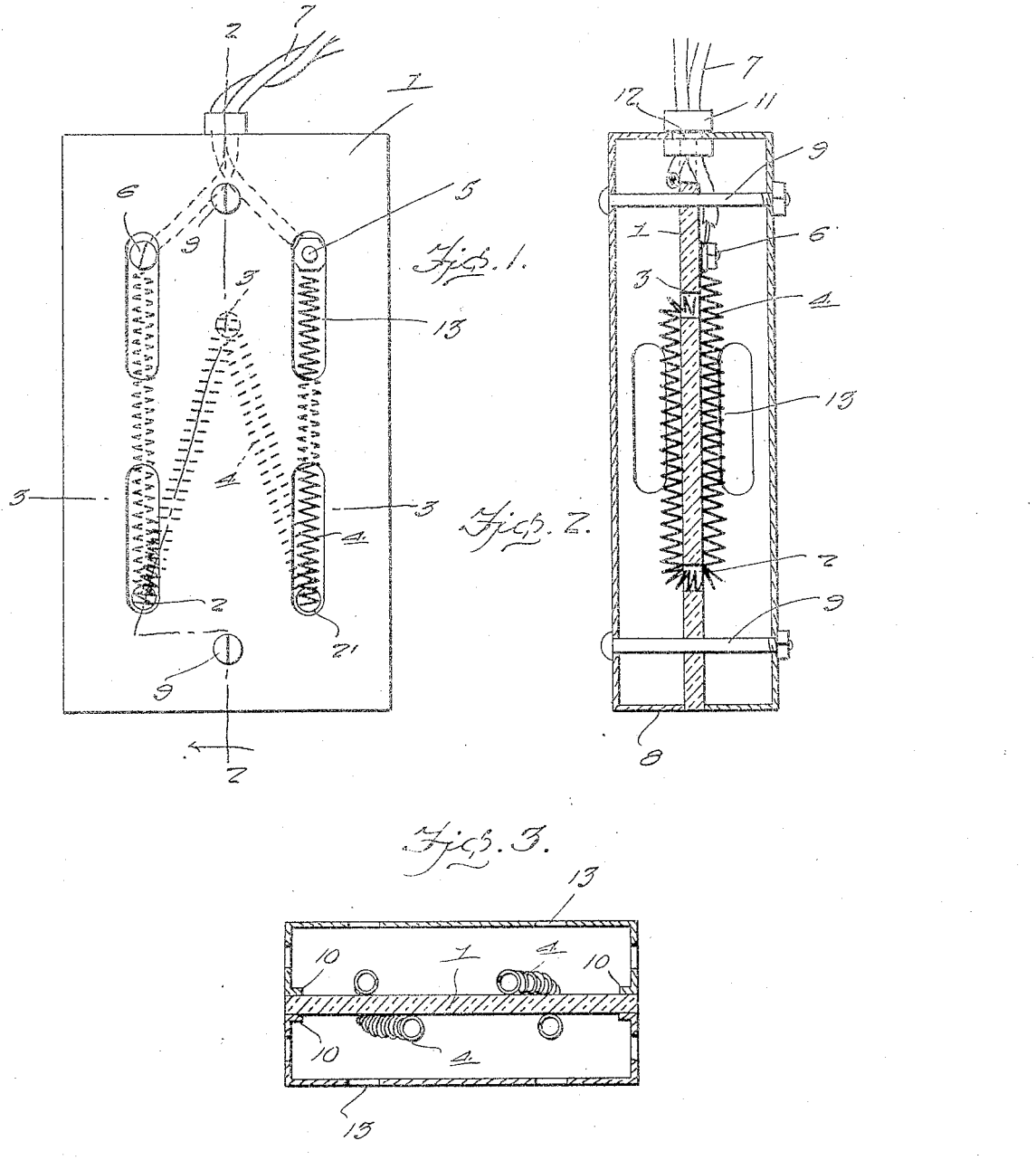

1,661,062

UNITED STATES PATENT OFFICE.

PAUL AMBORY, OF ROYAL OAK, MICHIGAN, ASSIGNOR TO LOUISE AMBORY, OF ROYAL OAK, MICHIGAN.

ELECTRICAL WATER HEATER.

Application filed June 11, 1927. Serial No. 198,140.

My invention relates to improvements in electrical water heaters, and the same pertains more particularly to heaters of the class employing an electrical heating element, which may readily be submerged in a vessel of water for heating the same.

An object of my invention is to provide the small compact heating device which may readily be placed within any vessel filled with water for quickly heating same.

Another object of my invention is to provide a casing to protect the electrical heating element thereof against accidental damage.

Still another object of my invention is to provide such a device of the class above set out which may be easily disassembled for the purpose of replacing a new heating element, should the one therein become damaged.

In the drawing:—

Figure 1 is a side elevation of the insulating plate employed in my invention and showing the electrical heating element.

Fig. 2 is a substantial vertical sectional view directly on the line 2—2 of Fig. 1, and Fig. 3 is a transverse sectional view on line 3—3 of Fig. 1, showing further the arrangement of the heating element on the insulating plate.

For convenience in the drawings, like numerals designate like parts in the invention.

The plate 1 is constructed of a suitable electrical insulating material and has formed therein and adjacent the lower edge portion thereof, a pair of openings 2 and 2' in spaced relation to each other. A further opening 3 is located a substantial distance above the pair of openings and centrally thereto is adapted to receive the intermediate portion of a single strand electrical heating element which is connected at one end to a binding post 5 located adjacent the top edge of the insulating plate and trained down one side thereof, and thence through the opening 2' and upward of the opposite side, and is further trained through the intermediate opening 3 in the first named side, thence down this side and to the opening 2 and the back of the opposite side again to terminate at the binding post 6.

Connected to the binding posts 5 and 6 respectively are the leads comprising the electrical conductor cords 7 which are connected at their opposite ends to a suitable plug for insertion within the usual electric light socket.

The outer edge portion of the insulating plate 1 is adapted to be clamped between the edges of complementary sections of a dividing chamber, and it is thus retained by suitable bolts 9 passed through the casing and insulating plate.

Flanges 10 are formed along the complementary edges of the dividing casing section to provide a greater clamping surface against the insulating plate. The hollow plugs 11 constructed of any suitable insulating material is formed with an angular groove 12 in which complementary struck-out recesses on the edges of the respective sections of the casing in contour with the curvature of the groove are adapted to engage when the casing is clamped against the plate.

The casing has struck therein openings 13 which allow for the admission of water when the device is submerged in the water to be heated.

Having thus described my invention, what I claim as new is:—

1. In an electrical water heater of the class described comprising, a casing divided into sections and having openings formed therein, an insulating plate having openings therein, said plate adapted to be mounted within said casing and between the complementary edges of said sections, a single strand electrical heating element arranged on said plate and adapted to be trained through the said opening in the plate for disposition of the same along each side of the plate, and means for clamping the said plate at its edge portion between the edges of the complementary sections of the casing.

2. In an electrical water heating device of the character described comprising, a casing divided into sections and having openings therein, said sections being provided with inwardly bent right angular flanges, an insulating plate having openings therein, said plate adapted to be mounted within said casing and between the flange portions of the complementary sections, a single strand electrical heating element arranged on said plate and adapted to be trained through said openings in the plate for disposition of same along each side of the plate and a bolt adapted to extend through the casing and insulating plate for securing the casing in clamping relation to the plate.

In testimony whereof I affix my signature.

PAUL AMBORY.